April 16, 1935.  W. V. CZARNECKI, JR  1,998,223
PRESSURE REGULATOR
Filed March 29, 1934
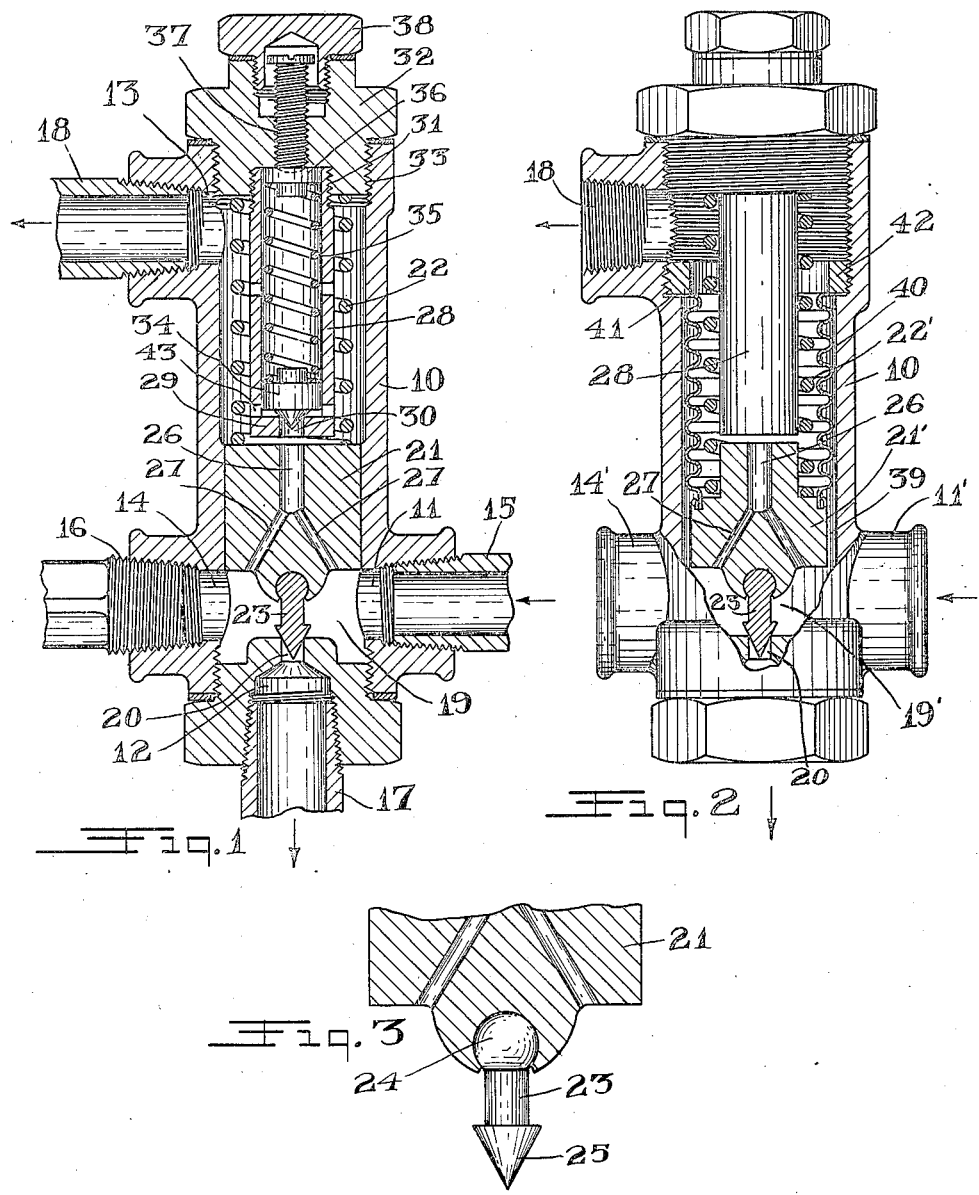
WITNESSES:
INVENTOR:
Walter V. Czarnecki Jr.
BY
ATTORNEY Patented Apr. 16, 1935

1,998,223

UNITED STATES PATENT OFFICE 1,998,223

PRESSURE REGULATOR

Walter V. Czarnecki, Jr., Eddington, Pa., assignor to Walter Czarnecki, Sr., Mary Czarnecki, Nellie Wojowski, Wesley Czarnecki, Stanley Czarnecki, Walter V. Czarnecki, Jr., and Casimar Czarnecki, a copartnership, Eddington, Pa., doing business as Eddington Metal Specialty Co.

Application March 29, 1934, Serial No. 717,906

6 Claims. (Cl. 137—153)

This invention relates to oil pressure valves, and has for an object to provide a valve of new and improved structure, providing for the passage of fluid after the fluid has reached a predetermined pressure, and to by-pass a part of said fluid after the predetermined pressure has been exceeded.

A further object of the invention is to provide a regulating valve for controlling the pressure of delivered fluid within a predetermined limit.

A further object of the invention is to provide a new and improved structure for controlling the passage of fluid and providing an improved type of self-centering valve.

The invention, therefore, comprises a housing having inlet, outlet and by-pass ports, the inlet port being introduced into a chamber having a valve seat opening into the outlet port, and with movable means controlling a valve normally closing said valve seat and movable under pressure built up within the chamber, the movement placing a conduit in said movable part in communication with a second conduit and opening the normal outflow passage, whereby excess pressure passing through the second conduit actuates a resiliently seated valve for permitting the flow of excess through both of said conduits to the bypass port.

The drawing illustrates several embodiments of the invention, and the views therein are as follows:

Figure 1 is a view in substantially diametrical section of one type of the regulating valve, Figure 2 is a view substantially in diametrical section, parts being shown in elevation of a modification of the valve, and Figure 3 is an enlarged detail view of the movable part carrying the outflow valve.

Like characters of reference indicate corresponding parts throughout the several views.

The pressure regulator comprises a housing 10 having an inlet port 11, an outlet port 12, and a by-pass port 13. A port 14 is also provided, which may be used in substitution for the port 11. An inlet pipe 15 will communicate with either of said ports 11 or 14, and the other of said ports will be closed, as by a plug 16, it being contemplated, however, that a gauge will be employed in the port, not employed for the flow of fluid, but such gauge is not important to the present invention.

From the outlet port 12 a pipe 17 will lead to the point of use, as for instance, an oil burner, while a pipe 18 from the port 13 will by-pass fluid back to the reservoir.

Communicating with the inlet port 12 is a chamber 19 having a valve seat 20 communicating with the outlet port 12. Mounted within the housing is a block 21 with a spring 22 tending to hold the block at the lower extreme of its movement, and the valve 23 in closing engagement with the valve seat 20.

This valve 23 is preferably formed with a ball 24, which forms a ball and socket joint with the block 21, as shown more particularly at Figure 3, and the closing end will preferably be conical or tapered, as shown at 25.

The block 21 is provided with an axial passage 26 and with one or more lateral passages 27 forming communication between the chamber 19 and the axial passage 26.

Mounted immediately above the block 21 is a sleeve 28 which has an end 29 closed except for a conduit 30, which is positioned to form continuation of the conduit 26 in the block 21. The sleeve 20 is rigidly mounted in any approved manner, as by the threaded connection 31 with the plug 32, which closes the upper end of the housing 10 by the screw threaded connection 33.

Mounted within the sleeve 28 is a piston valve 34 normally closing the conduit 30 and held yieldingly in such position by a spring 35. A disk 36 mounted within the sleeve 28 is subjected to the tension of the screw 37 to vary the tension of the spring 35 on the valve 34. The screw is preferably covered by a cap 38 after the proper adjustment has been attained, and vents 34' are provided in the sleeve 28 to provide for free action of the piston valve 34.

As a modification shown at Figure 2, the housing 10 also encloses a block 21' which, however, does not make fitting engagement with the housing, but provides a free passage 39 about said block. The block is, however, connected with a bellows diaphragm 40 having an outturned flange 41 clamped by a ring 42 to prevent the passage of fluid upwardly beyond the ring 42. A spring 22' is mounted within the bellows diaphragm, tending to hold the valve 23 to seat in the valve seat 20. The block 21' is provided with the axial conduit 26 and the lateral conduits 27. The sleeve 28 contains the piston valve 34, spring 35 with adjustments, as described in regard to Figure 1.

In operation, fluid under pressure being admitted through the pipe 15 into the port 11 or 11', will enter the chamber 19 or 19'. The lateral passages 27 are relatively small and initially the fluid under pressure will pass through these laterals and through the axial conduit 26, and through the space intervening between the block 21 and the end 29 of the sleeve 28. As the volume of inflow, however, is greatly in excess of the capacity of the laterals 27, pressure will build up in the chamber 29 until the block 21 is lifted against the tension of the spring 22 or the spring 22', as shown at Figure 2.

In the type shown at Figure 1, the block 21 will act as a piston, whereas, in the type shown at Figure 2, the fluid will act not only against the block, but against the exterior of the bellows diaphragm.

In either instance, the lifting of the block into engagement with the end 29 of the sleeve will close the interval between those two members, so that the axial conduit 26 will be in communication with the conduits 30. When pressure is built up in the chamber 19 in excess of the pressure required or desired to pass through the valve seat 20, the fluid under pressure, acting against the piston valve 34, will lift such valve so that the excess fluid will pass through the ports 43 and out through the by-pass port 13.

In the type shown at Figure 2, of course, this by-passed fluid will pass upwardly through the interior of the bellows diaphragm to the by-pass port. The pressure, however, within the diaphragm will be very slight as the capacity of the diaphragm, compared to the conduit, is great. There will be but little balancing pressure in there, therefore, to augment the pressure of the spring 22'.

By mounting the valve 23 with the ball and socket connection, with the block 21 or 21', the point will always center itself within the valve seat 20 and properly and completely close the passage. It will be noted that the block 21 or 21' can move only the space intervening between that block and the end 29 of the sleeve, hence, the point 25 of the valve 23 never clears the valve seat 20, and is always, therefore, in position to enter said valve seat 20 and to make complete closure therewith.

The space intervening between the block 21 and the end 29 of the sleeve 28 has heretofore been described as a by-pass operable at the instant of the beginning of operations, and until the pressure builds up into the chamber 19 to a sufficient extent to move the block 21 or, of course, the block 21', as shown at Figure 2.

In the event of the stoppage of the pump, the valve 23 will close as soon as the pressure decreases to less than that normally required. There will be an interval of time between the closing of the valve and the complete stoppage of the pump when fluid will continue to flow into the chamber 19 and provision must, therefore, be made for the by-passing of this fluid to relieve pressure. When the valve 23 has closed, it is obvious that the interval between the block 21 and the end 29 will form a minimum permanent by-pass in the same relation to the operation as when the operation is initiated.

Of course, the pressure regulator herein described may be modified and changed in various ways without departing from the invention herein set forth and hereinafter claimed.

I claim:—

1. A pressure regulator comprising a housing having an inlet port, an outlet port and a by-pass port, a valve seat in communication with the outlet port, a block mounted and movable within the housing and carrying a valve adapted to close the valve seat, a sleeve mounted within the housing having an end provided with a conduit, said block having conduits therethrough adapted to communicate with the conduit of the sleeve, a valve positioned to close the conduit of the sleeve, resilient means for moving the block to close the valve carried thereby, resilient means to close the valve within the sleeve, and means to regulate the pressure on said last mentioned valve.

2. A pressure regulator comprising a housing forming a chamber having a block piston mounted therein and slidable longitudinally thereof, a valve carried within the chamber by said block piston, resilient means urging the movement of the block in one direction, a stop to engage and limit the movement of the block in the opposite direction, said stop being provided with a conduit and the block being provided with a conduit positioned to communicate and register with the conduit of the stop when in engagement, a valve associated with the conduit of the stop, resilient means tending to hold said last mentioned valve to seat, and means to adjust the tension on said last mentioned valve.

3. A pressure regulator comprising a housing, a bellows diaphragm mounted within the housing, a block carried by the bellows diaphragm, a valve carried by the block, a stop mounted within the bellows diaphragm and provided with a conduit, said block being provided with a conduit adapted to register with the conduit of the stop, a valve adapted to close the conduit of the stop, resilient means tending to hold the block at the limit of movement away from said stop, and means to adjust the tension on the valve coacting with the stop.

4. In a pressure regulator, a housing providing a chamber, said chamber having a valve seat formed therein, a block having a by-pass conduit therethrough movable within the chamber under the pressure of fluid within the chamber, a needle valve having a ball and socket connection with the block and adapted to close the valve seat at one limit of movement of the block and flow controlling means cooperating with the by-pass.

5. A pressure regulator comprising a housing having inlet, outlet and by-pass ports, said housing forming a chamber in communication with the inlet port, a valve seat interposed between the inlet port and the outlet port, a block movable within the chamber, a valve having ball and socket connection with the block and adapted to close the valve seat, means to confine pressure within the chamber to move the block away from the valve seat, a sleeve mounted coaxially with the block and having an end provided with a conduit, said block being provided with a conduit adapted to register with the conduit end of the sleeve and communicate with the chamber, a valve for closing the conduit of the end of the sleeve, resilient means tending to move the block into position to close the valve seat of the chamber, resilient means tending to move the valve into closing relation to the conduit of the sleeve, means to adjust the pressure on said last mentioned valve, said sleeve being provided with outlet orifices in communication with the by-pass port and uncovered when the valve of the sleeve is moved under the pressure through the combined conduits.

6. A pressure regulator comprising a housing having inlet, outlet and by-pass ports, said housing forming a chamber in communication with the inlet port, means provided with a valve seat within said chamber, said seat forming part of the outlet, a member mounted to move within the chamber toward and away from said valve seat, a self-centering valve carried within the chamber by the movable member adapted to close the valve seat, said movable member being provided with an axial conduit in communication with the chamber, a stop member for limiting the valve opening movement of the movable member, said stop member being provided with a conduit registering with the conduit of the movable member, a valve closing the conduit of the stop, and resilient means controlling the movement of the movable member and the conduit closing valve.

WALTER V. CZARENCKI, Jr.